Nov. 30, 1926.
G. E. PHILPY
1,609,189
SWIVEL JOINT SUCKER ROD SHOCK ABSORBER
Original Filed May 13, 1925
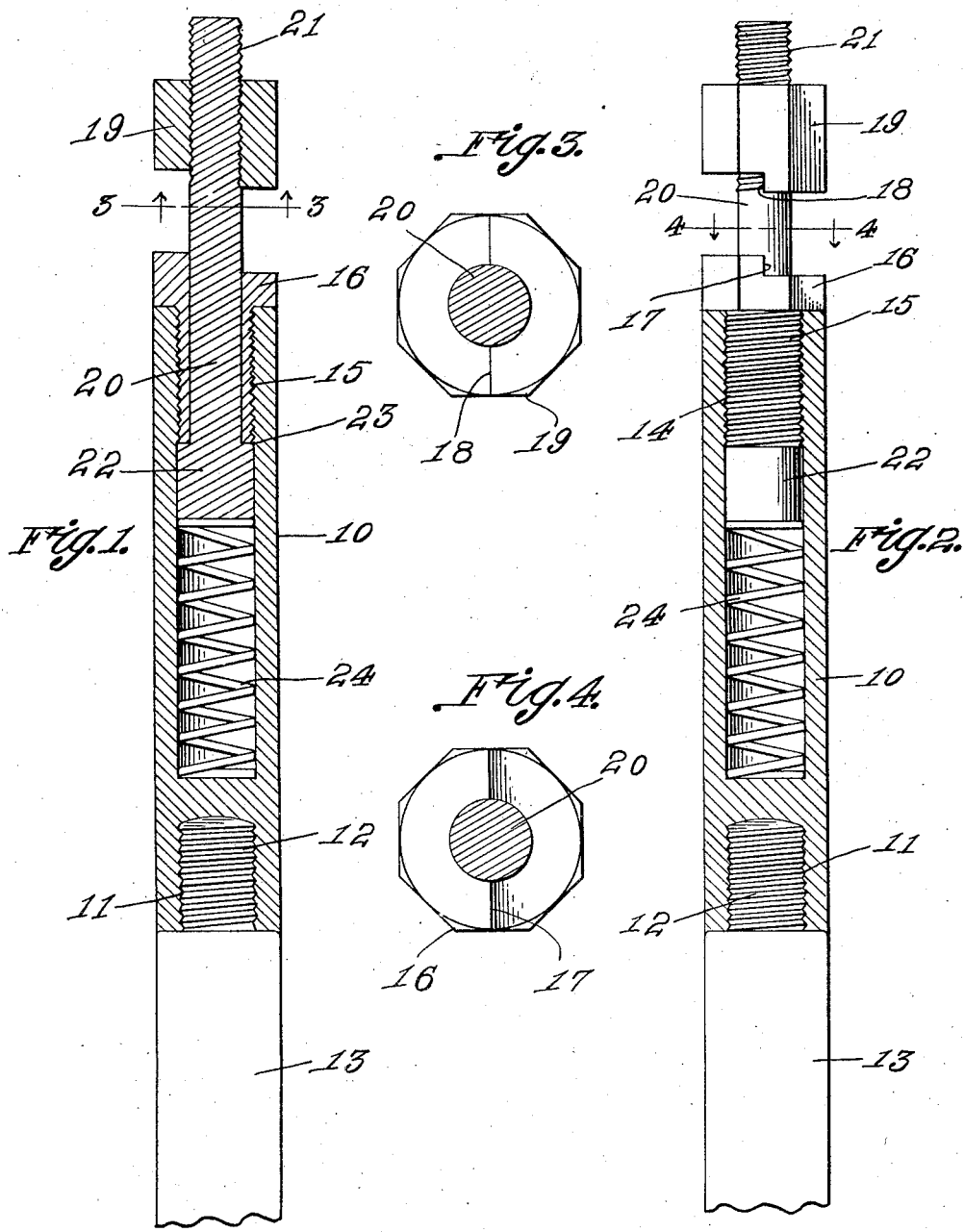

Patented Nov. 30, 1926.

1,609,189

UNITED STATES PATENT OFFICE.

GEORGE E. PHILPY, OF BURKBURNETT, TEXAS.

SWIVEL-JOINT SUCKER-ROD SHOCK ABSORBER.

Application filed May 13, 1925, Serial No. 30,049. Renewed May 28, 1926.

This invention contemplates the provision of a swivel joint for sucker rods or the like, and is designed to prevent a rod from becoming separated while being lowered into the well, as well as to prevent the working valve from wearing in the same place.

In carrying out the invention I also provide means for absorbing the shock and jar of the rod, to which it is usually subjected when brought into contact with the fluid.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views, and wherein:

Figure 1 is a vertical sectional view through the invention showing how it is associated with the sucker rod.

Figure 2 is a similar view showing the swivel rod in elevation.

Figure 3 is a sectional view on line 3—3 of Figure 1.

Figure 4 is a sectional view on line 4—4 of Figure 2.

This invention embodies a hollow tubular body member 10 which may be varied in size without departing from the spirit of the invention, the lower end being formed to provide a threaded socket 11 into which is adapted to be screwed the reduced threaded extremity 12 of the sucker rod or the like 13. This body member 10 is also interiorly threaded adjacent its upper end as at 14 to accommodate the threads of a bushing 15. This bushing is formed with a head 16 adapted to repose upon the upper end of the body member 10, while the head is formed with a transverse shoulder 17 to cooperate with a similar shoulder 18 formed on the adjacent end of the assembling nut indicated at 19. By reason of this construction, the shoulder 18 when engaging the shoulder 17 provides a connection between the nut 19 and the bushing 15 so that the parts can be assembled or disassembled from the top of the well if it becomes necessary by rotating the rod 20. This nut is carried by the swivel rod 20 which is threaded for a portion of its length as at 21. The rod 20 is mounted to slide through the bushing 15, and is formed with an enlarged lower end portion 22 defining a shoulder 23 which when resting or bearing against the adjacent end of the bushing 15 forms a swivel joint, which obviously allows the body member 10 together with the sucker rod to rotate in relation to the swivel rod 20. Consequently, the rod 13 can be lowered into the well with little or no possibility of said rod separating itself from the body member 10 by turning with relation thereto. In order to absorb the shock and jars of the rod incident to its contact with the fluid in the well, I make use of a coil spring 24 which is arranged within the body portion 12, having one end bearing against the adjacent end of the swivel rod 20, while the other extremity of the spring rests upon the adjacent end of the body member 10. The invention is very simple in construction and particularly advantageous for the purposes indicated.

While it is believed that the advantages of the invention will be readily understood from the foregoing description, I desire to have it known that I do not limit myself to what is herein shown and described, and that such changes may be resorted to as fall within the scope of what is claimed.

What I claim is:

A swivel connection for sucker rods or the like comprising a tubular body portion having a threaded socket in one end adapted to receive the adjacent end of said rod, a bushing threaded in the other end of said body member, a transverse shoulder formed on said bushing, a swivel rod slidable through said bushing and threaded for a portion of its length, an assembling nut threaded on said swivel rod, a transverse shoulder formed on the lower end of said nut and adapted to engage the transverse shoulder on said bushing when said swivel rod is lowered, whereby said connection can be assembled or disassembled from the top of the well when necessary by rotating said swivel rod, and a coiled spring arranged within the body member and interposed between the bottom thereof and the lower end of said swivel rod for the purpose specified.

In testimony whereof I affix my signature.

GEORGE E. PHILPY.